June 10, 1947.  L. B. RIVARD ET AL  2,421,851
VEHICLE SEAT
Filed May 17, 1943
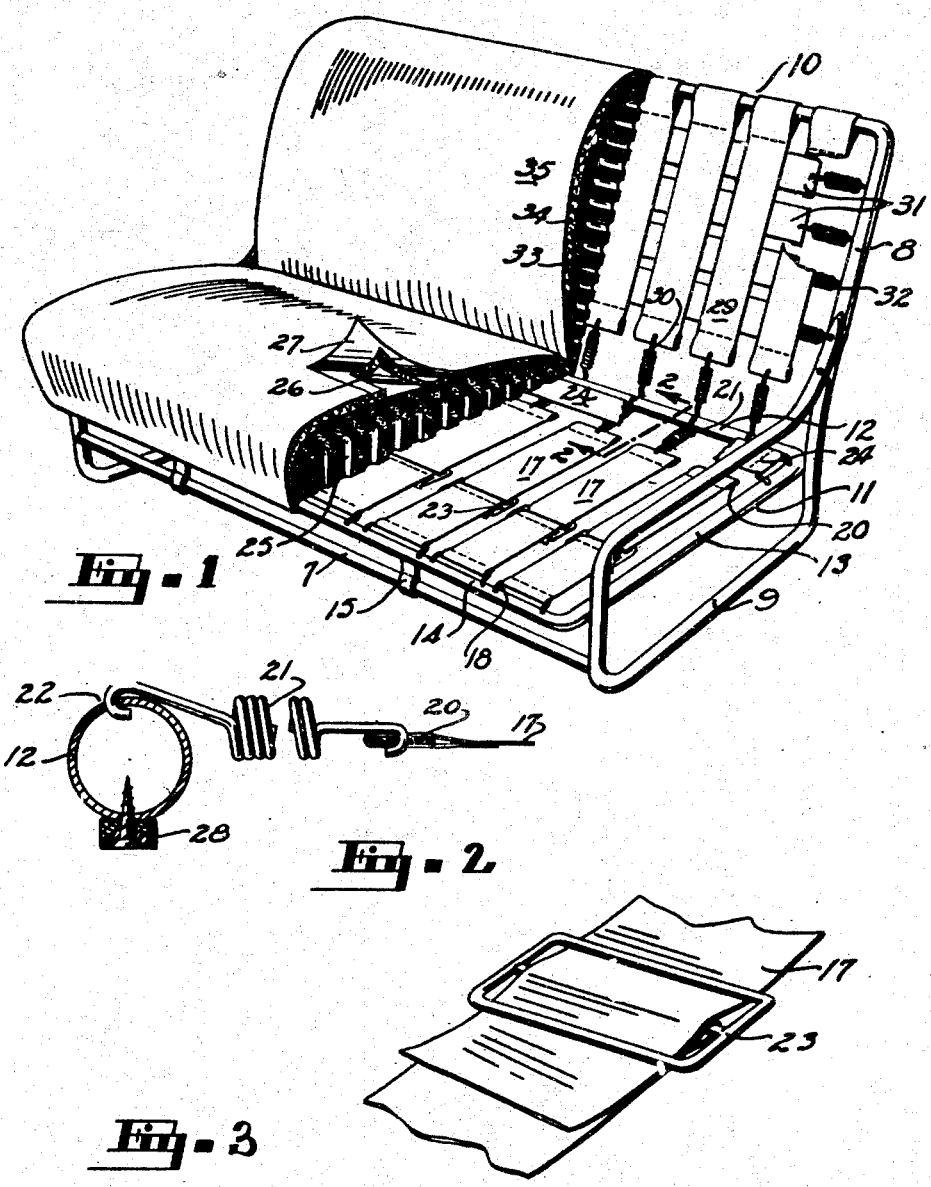
L. B. Rivard
W. Jensen
INVENTORS.

Patented June 10, 1947

2,421,851

UNITED STATES PATENT OFFICE 2,421,851

VEHICLE SEAT

Lawrence B. Rivard, Dearborn, and Walter Jensen, Detroit, Mich., assignors to Ford Motor Company, Dearborn, Mich., a corporation of Delaware Application May 17, 1943, Serial No. 487,266

1 Claim. (Cl. 155—53)

This invention relates to a seating construction of a motor vehicle and more particularly to a type of spring to be used in the cushion construction thereof.

The seat of the present invention is characterized, first, in the minimum depth of cushion required to obtain the desired resiliency; and, second, in the provision made for adjustment over varying extents of the seat proper. The first consideration is highly important in present motor car construction since the depth required to obtain a comfortable cushion often exceeds the heights available and requires a body arrangement and clearance heights which preferably should be avoided. Its importance as applied to aircraft seats is that a thinner cushion employs a minimum material with a consequent saving in weight. In this respect, a feature which has particular importance at the present time is that adequate springing action is obtained with a minimum use of metal. The advantage of the second feature of this construction, namely that of adjustability, is that it is possible to provide differential spring rates for different portions of a vehicle seat. Thus, the driver's portion of the front seat, which normally is subjected to greatest use and heavier weights, may be adjusted to a somewhat higher tension and during the continued life of the car, this adjustment may be increased to compensate for any deterioration in the cushion. Other advantages of the adjustment feature will suggest themselves and it will be particularly noted in the present instance that the means employed are such as to make the adjustment readily accessible without removing any portion of the seat structure proper.

Beside the fact of adjustability and the use of non-metallic materials, the present seat is as durable as those constructed along conventional lines and far surpasses them from the weight standpoint. It also may be shown that the present seat is as comfortable as one of conventional construction which has a far greater cushion depth so that the diminution in material and space is not reflected in any consequent decrease of comfort and utility.

With these and other objects in view, the invention consists in the arrangement, construction and combination of the various parts of the improved device as described in the specification, claimed in the claim and illustrated in accompanying drawings in which:

Fig. 1 is a perspective view of a seat constructed according to this invention, a portion of it being cut away to show interior construction.

Fig. 2 is a detail on an enlarged scale indicated by the line 2—2 of Fig. 1.

Fig. 3 is a perspective view on an enlarged scale of the under side of one of the seat straps showing details of the buckle mechanism.

Referring to Fig. 1, 10 indicates generally a seat frame of tubular construction in which 11 is a rectangular base frame having sides 13, front bar 14 and back bar 12 supported on side members 9 which are extended to form the back frame 8 and are separated by a strut 7. Braces 15 support front bar 14 from strut 7. The seat web construction 16 comprises a plurality of transverse web straps 17 each secured to the front bar 14 by U-shaped metal clips 18 whose ends are engaged in holes therein. The rear end of the strap is looped around a filler 20 in which is secured one end of the spring 21 whose other end engages a hole 22 in the back bar 12. The web strap 17 is actually formed in two parts and is joined by a frictional securing means 23, as shown in Fig. 3, which is of conventional design and which permits the overall length of the strap to be varied thereby imposing different tensions upon the spring 21. A plurality of longitudinal straps 24 overlies the seat web construction 16, but one being shown; and while these are customarily spring supported at one end in the same manner as the straps 17 or at both ends, it is not usually necessary to have the adjustable feature just described.

A cushion 25 of sponge rubber, latex foam or the like is supported on the seat web construction 16 and in turn is covered by a layer of padding 26 and the upholstery 27 which is held in place by nailing to the tacking strips 28 secured to the bottom surface of the front and back bars.

The back of the seat is of somewhat similar construction having the transverse straps 29, springs 30, and longitudinal straps 31 employing the springs 32, the cushion 33, padding 34 and upholstery 35. While the adjustable feature is not shown as incorporated in the web construction for the back, since the loads imposed there are less severe, it may be used should this prove desirable.

It will be observed that with this construction, the requisite spring action is obtained entirely through the use of the thin web structure confined to a minimum vertical dimension and that by placing the springs themselves in the rear portion of the base frame, as well as those in the back section being placed in the lower portion thereof, a particular suitable distribution in springing action is obtained which contributes greatly to the comfort of the seat. Apart from this the construction is entirely unitary and readily accessible for adjustment in these particular conditions of use or to compensate for wear when this occurs. In the event of wear or deterioration of the spring web, the separate webs are readily replaced without disturbing the cushion or upholstery construction itself.

Some changes may be made in the arrangement, construction and combination of the several parts comprising the improved device without departing from the spirit of the invention and it is the intention to cover by the claim such changes as may be reasonably included within the scope thereof.

The invention claimed is:

In combination in a vehicle seat construction, a floor engaging portion formed of tubular material, a horizontally extending, substantially rectangular base frame of similar material supported above the floor engaging portion and rigidly secured thereto, a vertically extending back frame arranged at an angle to said floor engaging portion and said horizontally extending base frame and rigidly secured thereto, web structures comprising a plurality of substantially nonextensible spaced longitudinal and spaced transverse fabric straps suspended from each of said frames, said transverse straps in said base frame being equipped with selective tension adjuster loops and being hingedly secured to said base frame at the front thereof and terminating in a spring which, in turn, is attached to the rear member of said base frame, said transverse straps in said back frame being hingedly secured to said back frame at the top thereof and terminating in a spring which, in turn, is secured to the said rear member of the said base frame, the lengths of said springs being small in proportion to the lengths of their respective fabric straps and said springs being concentrated adjacent the rear member of said base frame.

LAWRENCE B. RIVARD.
WALTER JENSEN.

REFERENCES CITED

The following references are of record in the file of this patent:

UNITED STATES PATENTS

| Number | Name | Date |
|---|---|---|
| 1,019,510 | Mestas | Mar. 5, 1912 |
| 1,768,383 | Van Hove | June 24, 1930 |
| 2,106,066 | Sadgrove | Jan. 18, 1938 |
| 1,948,130 | Reed | Feb. 20, 1934 |
| 1,208,094 | Chenault | Dec. 12, 1916 |
| 1,978,343 | Davies et al. | Oct. 23, 1934 |
| 692,705 | Plettenberg | Feb. 4, 1902 |
| 1,584,577 | Weickman | May 11, 1926 |
| 38,551 | Blythe | May 19, 1863 |
| 1,668,473 | Weickman et al. | May 1, 1928 |
| 1,203,293 | Wilkinson | Oct. 31, 1916 |
| 2,231,346 | Riesing et al. | Feb. 11, 1941 |
| 2,029,247 | Mercogliano | Jan. 28, 1936 |
| 1,879,724 | Wolpert | Sept. 27, 1932 |
| 1,986,060 | Heller | Jan. 1, 1935 |
| 726,042 | Franz | Apr. 21, 1903 |
| 1,097,405 | Erb | May 19, 1914 |
| 2,133,747 | Hunter | Oct. 18, 1938 |

FOREIGN PATENTS

| Number | Country | Date |
|---|---|---|
| 497,436 | Great Britain | Dec. 20, 1938 |
| 507,111 | France | June 14, 1920 |